UNITED STATES PATENT OFFICE.

PAUL JULIUS, OF LUDWIGSHAFEN, GERMANY, AND GEORGES E. DARIER, OF GENEVA, SWITZERLAND, ASSIGNORS TO THE BADISCHE ANILIN AND SODA FABRIK, OF LUDWIGSHAFEN, GERMANY.

PHOSPHIN DYE AND PROCESS OF MAKING SAME.

SPECIFICATION forming part of Letters Patent No. 617,340, dated January 10, 1899.

Application filed December 27, 1897. Serial No. 663,731. (Specimens.)

*To all whom it may concern:*

Be it known that we, PAUL JULIUS, a subject of the Emperor of Austria-Hungary, residing at Ludwigshafen-on-the-Rhine, Germany, and GEORGES E. DARIER, a citizen of the Swiss Republic, residing at Geneva, Switzerland, both doctors of philosophy, have invented new and useful Improvements in the Manufacture of Asymmetric Diamido-Phenyl Acridines and their Alkyl Substitution Products, (for which patents were obtained in Germany April 13, 1897, No. 94,951, and in France June 14, 1897, No. 267,848,) of which the following is a specification.

This invention is based upon the discovery that the phosphins and their alkyl substitution products, (substitution in the amido group,) which latter have not been previously known, can be obtained by condensing paraamidobenzaldehyde or its substitution products with the alphyl derivatives of the metatoluylenediamin.

The following example will serve to illustrate the manner in which our invention can best be carried into practical effect. The parts are by weight:

Example: Thoroughly mix three (3) parts of dimethyl-paraämidobenzaldehyde and five (5) parts of phenyl-metatoluylenediamin chlorhydrate in an enameled vessel. Stir and heat at one hundred and forty to one hundred and fifty degrees centigrade (140° to 150 °centigrade) until the mass, which at the beginning is a thin liquid, has become tough and a test portion solidifies at once to a brittle mass. Cool and break up the dark-brown melt, extract it with about two thousand (2,000) parts of hot water containing twenty-five (25) parts of hydrochloric acid, (of specific weight 1.15.) Cool, filter off the solution, and precipitate it with a little saltpeter. Filter off the solution from the separated resinous products, salt it out further, and cool with ice. The new dyestuff so obtained is a yellowish-red precipitate. Filter, press, and dry at a temperature of thirty to forty degrees centigrade, (40° to 50° centigrade.)

This dyestuff dissolves in hot water with a reddish-yellow color, which solution becomes light yellow by the addition of dilute mineral acids.

The dyestuff is soluble in alcohol and can be precipitated from this solution by ether. The concentrated sulfuric-acid solution has a green color and green fluorescence. By the addition of caustic soda to the aqueous solution brownish-yellow flocks are yielded, which on heating become light yellow. These flocks dissolve in ether and benzene with a yellow color and green fluorescence and in concentrated sulfuric acid with a green fluorescence.

Now what we claim is—

1. The new process for the manufacture of phosphins by condensing paraämidobenzaldehyde with the alphyl derivatives of the metatoluylenediamin substantially as hereinbefore described.

2. The new process for the manufacture of amido-alkyl substitution products of the phosphins by condensing alkylated paraämidobenzaldehydes with the alphyl derivatives of the metatoluylenediamin substantially as hereinbefore described.

3. As a new article of manufacture the dimethyl substituted phosphin which can be obtained by condensing dimethyl-paraämidobenzaldehyde with phenyl-metatoluylenediamin, and which dissolves in hot water with a reddish-yellow color which solution becomes light yellow by the addition of dilute mineral acids, is soluble in alcohol and can be precipitated from this solution by ether, with concentrated sulfuric acid gives a green color and green fluorescence, and by the addition of caustic soda to the aqueous solution brownish-yellow flocks are yielded which on heating become light yellow; the flocks dissolving in ether and benzol with a yellow color and a green fluorescence and in concentrated sulfuric acid with a green fluorescence all substantially as hereinbefore described.

In testimony whereof we have hereunto set our hands in the presence of two subscribing witnesses.

PAUL JULIUS.
GEORGES E. DARIER.

Witnesses for Paul Julius:
G. LICHTENBERGER,
BERNHARD C. HESSE.

Witnesses for Georges E. Darier:
BENJ. H. RIDGELY,
E. F. BARRY.